(12) United States Patent
Dets

(10) Patent No.: US 11,829,560 B2
(45) Date of Patent: Nov. 28, 2023

(54) INTERACTIVE INPUT SYSTEM WITH ILLUMINATED BEZEL

(71) Applicant: SMART TECHNOLOGIES ULC, Calgary (CA)

(72) Inventor: Sergiy Dets, Calgary (CA)

(73) Assignee: SMART TECHNOLOGIES ULC, Calgary (CA)

(*) Notice: Subject to any disclaimer, the term of this patent is extended or adjusted under 35 U.S.C. 154(b) by 0 days.

(21) Appl. No.: 17/424,328

(22) PCT Filed: Jan. 28, 2020

(86) PCT No.: PCT/CA2020/050096
§ 371 (c)(1),
(2) Date: Jul. 20, 2021

(87) PCT Pub. No.: WO2020/154798
PCT Pub. Date: Aug. 6, 2020

(65) Prior Publication Data
US 2022/0113820 A1 Apr. 14, 2022

Related U.S. Application Data

(60) Provisional application No. 62/798,207, filed on Jan. 29, 2019.

(51) Int. Cl.
*G06F 3/042* (2006.01)
*F21V 8/00* (2006.01)

(52) U.S. Cl.
CPC ............ *G06F 3/042* (2013.01); *G02B 6/001* (2013.01)

(58) Field of Classification Search
CPC G06F 3/042; G06F 2203/04108; G02B 6/001
See application file for complete search history.

(56) References Cited

U.S. PATENT DOCUMENTS

| | | | |
|---|---|---|---|
| 4,559,583 A * | 12/1985 | Ku | F21L 2/00 40/124.02 |
| 5,934,781 A | 8/1999 | Whitaker | |
| 2008/0013913 A1 | 1/2008 | Lieberman et al. | |
| 2011/0032216 A1 | 2/2011 | Hos et al. | |
| 2011/0050650 A1 * | 3/2011 | McGibney | G06F 3/0425 345/175 |
| 2011/0128219 A1 | 6/2011 | Sirotich et al. | |
| 2011/0169727 A1 | 7/2011 | Akitt | |
| 2011/0188261 A1 * | 8/2011 | Deng | G02B 6/0003 264/1.24 |
| 2011/0241984 A1 | 10/2011 | Morrison et al. | |

(Continued)

FOREIGN PATENT DOCUMENTS

KR 20190007807 1/2019

*Primary Examiner* — Patrick N Edouard
*Assistant Examiner* — Joseph P Fox
(74) *Attorney, Agent, or Firm* — Dickinson Wright PLLC; Andrew D. Dorisio

(57) ABSTRACT

An interactive input system with bezel light around an input area provided by optical fiber is described. Two or more cameras have a field of view of at least a portion of the bezel. The optical fiber provides continuous backlight illumination to at least one input object. The optical fiber has at least one nanostructure therein for diffusing light. At least one light source provides a directional light to an end of the optical fiber.

18 Claims, 13 Drawing Sheets

(56) References Cited

U.S. PATENT DOCUMENTS

| | | |
|---|---|---|
| 2011/0305035 A1 | 12/2011 | Bickham et al. |
| 2013/0088888 A1 | 4/2013 | Fewkes et al. |
| 2013/0272014 A1 | 10/2013 | Logunov et al. |
| 2014/0355295 A1 | 12/2014 | Kuchinisky et al. |
| 2016/0025917 A1 | 1/2016 | Wang |

* cited by examiner

INTERACTIVE INPUT SYSTEM WITH ILLUMINATED BEZEL

RELATED APPLICATION

The present application claims priority to U.S. Prov. App. No. 62/798,207, filed Jan. 29, 2019, the contents of which are explicitly incorporated by reference in its entirety.

FIELD

This invention is in the field of interactive input systems, and more specifically to interactive input systems with bezel light.

BACKGROUND

U.S. Pat. No. 7,573,465 to Lumio Inc., the contents of which are incorporated by reference in its entirety, discloses an optical touch panel including a support. An optical light guide illumination assembly is arranged along and above at least most of a periphery of the support to define a detection region. The assembly includes at least one optical light guide and a light source arranged for directing light along the optical light guide. At least one light detector detects changes in the light received from the optical light guide illumination assembly produced by the presence of an object in the detection region. Detection circuitry receives at least one output from the at least one light detector and provides an output indication of the two dimensional location of the object present in the detection region.

U.S. Pat. No. 7,468,785 to Lumio Inc., the contents of which are incorporated by reference in its entirety, teaches an apparatus for information input to a computing device including imaging sensors arranged to simultaneously view an input region and enhanced triangulation signal processing circuitry receiving signal outputs from two of the imaging sensors. The signal outputs contain information indicating an angular position of an object relative to each of the two imaging sensors and information representing angles respectively subtended by the object with respect to each of the two imaging sensors. The enhanced triangulation signal processing circuitry provides an object location output based not only on the information indicating an angular position of the object but also on the relationship between the angles respectively subtended by the object.

U.S. Pat. No. 7,333,094 to Lumio Inc., the contents of which are incorporated by reference in its entirety, discloses an optical touch panel including a support. An optical fiber illumination assembly arranged along and above at least part of a periphery of the support to define a detection region. The assembly including at least one optical fiber and a light source arranged for directing light along the at least one optical fiber. At least one light detector detects changes in the light received from the optical fiber illumination assembly produced by the presence of a finger or stylus in the detection region. The detection circuitry receives at least one output from the at least one light detector and provides an output indication of the two dimensional location of finger or stylus impingement in the detection region.

U.S. Pat. No. 7,302,156 to Lumio Inc., the contents of which are incorporated by reference in its entirety, teaches an optical system including at least one optical fiber having a core and cladding. The at least one optical fiber has a cross section defining a circumference and has at least one light scattering discontinuity at one or more locations therealong. The at least one optical fiber has optical power at least one light transmissive region having a focus located in proximity to the discontinuity. The at least one light scattering discontinuity has an angular extent of less than ten percent of the circumference and the at least one light transmissive region having an angular extent of more than 25% of the circumference. A light source is arranged for directing light along the at least one optical fiber.

U.S. Pat. No. 8,780,087 to Kim, the contents of which are incorporated by reference in its entirety, discloses an optical touch screen having infrared light source generators generating a plurality of infrared light sources forming fine coordinates at a predefined spacing toward the touch area from four inner sides of the main body. Light emission portions of the infrared light sources forming fine coordinates are positioned above the touch area, and disposed on the four sides of the touch area in a certain alignment. The infrared light sources form fine coordinates that function as references for coordinates in a horizontal axis and a vertical axis on the touch area.

U.S. Pub. No. 2011/0122646 to Bickham et al., the contents of which are incorporated by reference in its entirety, discloses light diffusing optical fibers having a region with nano-sized structures. The optical fiber is configured to scatter guided light via the nano-sized structions away from the core and through the outer surface, to form a light-source fiber portion having a length that emits substantially uniform radiation over its length.

U.S. Pub. No. 2002/0030999 to Lundin, the contents of which are incorporated by reference in its entirety, discloses an illumination device that is relatively bright and uniform in appearance that includes a light guide. The light guide has a light guide core having an optically smooth surface for propagating light therethrough. A light emitting region, which extends along a portion of the core, includes at least one light extraction structure located along the optically smooth surface of the light guide core. The light extraction structure, which includes an optically reflective surface reflective surface extending into the light guide core, is oriented to reflect light at an angle less than a critical angle necessary for light to propagate through the light guide core. A diffuse reflective material is disposed around at least a portion of the light guide. The diffuse reflective material directs at least a portion of the light reflected by the light extraction structure back through the light guide so that light is emitted through the light emitting region of the optically smooth surface.

EP 0956472 B1 to Lundin et al., the contents of which are incorporated by reference in its entirety, discloses an optical fiber that includes an optical fiber core having a first end, a second end, and an optically smooth surface extending longitudinally along the length of the fiber. The optically smooth surface is capable of reflecting light incident on the surface with minimal scattering or diffusion. Although the fiber depicted is a naked fiber, the fiber may include cladding layers and/or additional jacketing layers. The optical fiber is provided with a plurality of optical elements centered about the first longitudinal axis extending along the optically reflective surface of the fiber and plurality of optical elements centered about a second longitudinal axis of the optical fiber. The optical elements encompass any controlled interruption formed in the core of the optical fiber capable of reflecting at least a portion of light impinging thereon through the opposing wall of the fiber.

SUMMARY

The aspects as described herein in any and/or all combinations.

According to an aspect herein, an interactive input system may comprise: an input area with a bezel; at least two imaging devices having fields of view generally across the input area or encompassing at least a portion of the bezel; an optical fiber housed within the bezel provides continuous backlight illumination to one or more input objects; one or more light sources providing a light to an end of the optical fiber. A processing structure may execute instructions from a tangible computer-readable medium. The instructions may comprise at least one of: receiving at least one image from each of the at least two imaging devices; detecting the input objects; determining a position of the input objects; and tracking the position of the input objects. In some aspects, each imaging device may have at least one camera filter.

In some aspect, the optical fiber may comprise one or more nanostructures for diffusing light. The nanostructures may comprise a plurality of notches from an outer surface of a cladding to a core of the optical fiber. The plurality of notches may have a leaf-shaped profile. The plurality of notches may each comprise about a 100-degree opening. The light may propagate within the core of the optical fiber may be emitted from each of the plurality of notches.

According to some aspects, the optical fiber may have one or more segments. In other aspects, the optical fiber may comprise a continuous optical fiber with one or more loops. The loops may have a radius of curvature of between about 8-mm to about 25-mm and be located proximate to the corners of the input area. The optical fiber may have an outer cross-sectional diameter of about 230-μm.

In some aspects, the bezel may have a conduit for receiving the optical fiber. A filter may extend along the conduit and filtering the continuous backlight illumination. In some aspects, one or more additional optical fibers may be used. The bezel may comprise a conduit for receiving the optical fiber and the at least one additional optical fiber. The bezel may further comprises a light redirection element.

In some aspects, the one or more light sources may modulate the light in a time domain. The one or more sources may provide a first wavelength of the light. A second optical fiber housed within the bezel may provide a second wavelength of the light.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Figure 1:
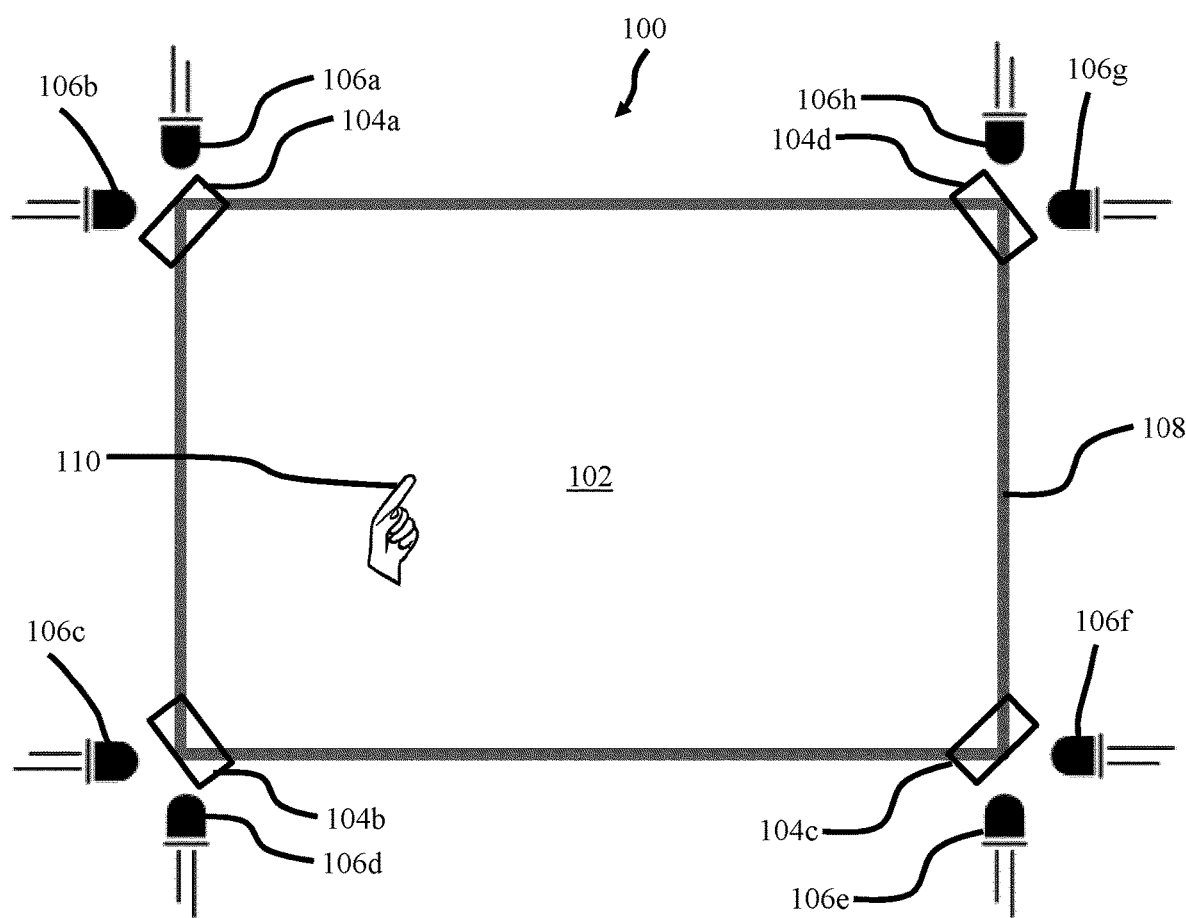
FIG. 1 is an exaggerated front view of an illuminated bezel for an interactive input system.
Figure 2A:
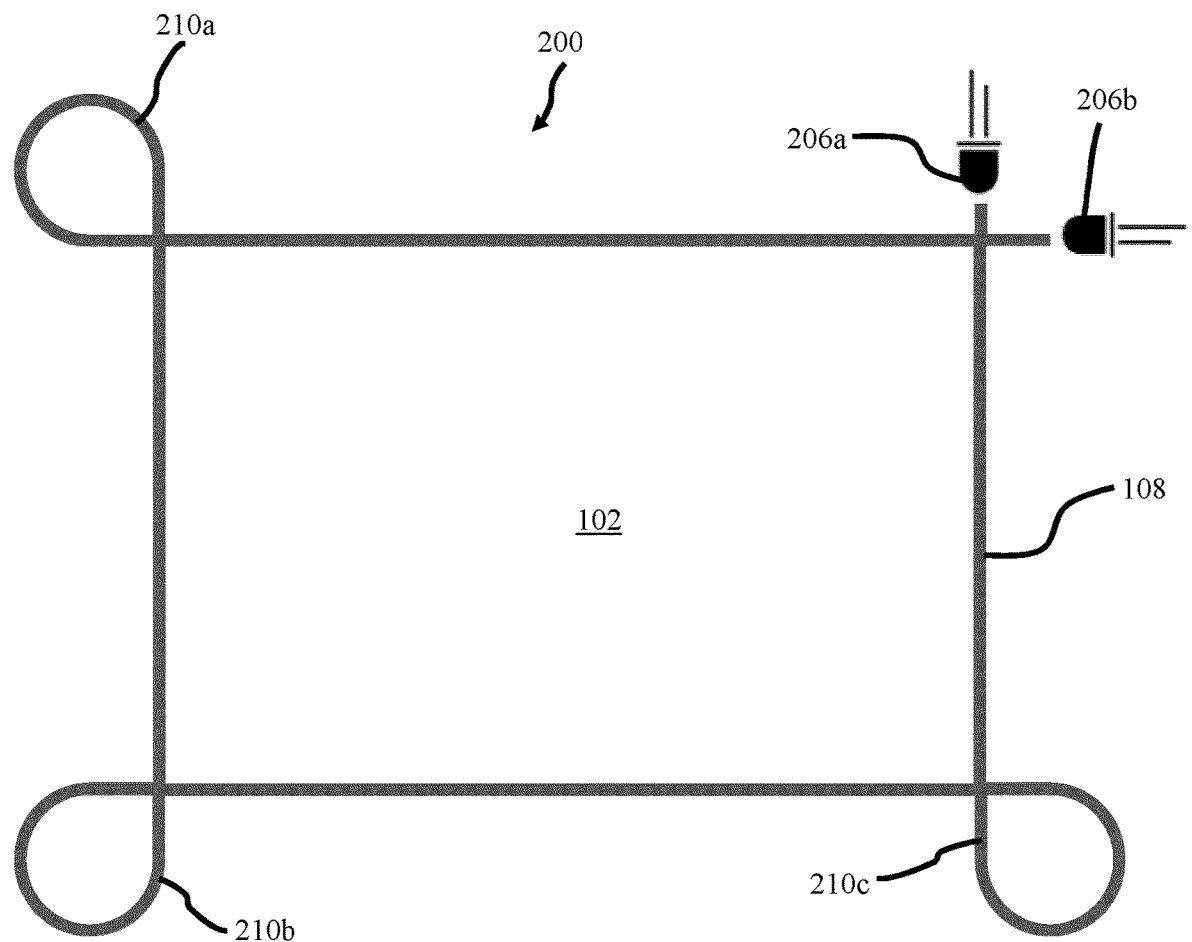
FIG. 2A is an exaggerated front view of the illuminated bezel using a continuous optical fiber.
Figure 2B:
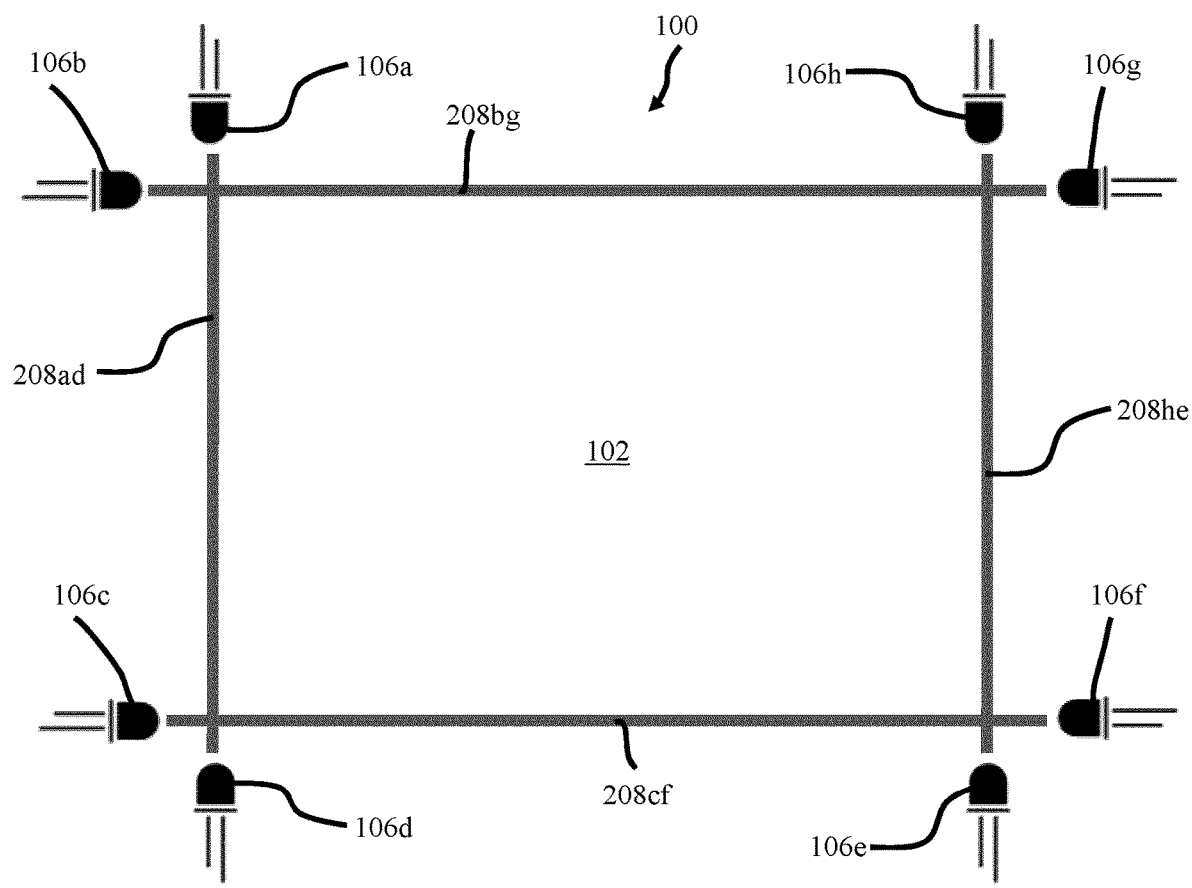
FIG. 2B is an exaggerated front view of the illuminated bezel using four segments of the optical fiber.

With reference to FIGS. 1, 2A and 2B, an interactive input system 100 may comprise a generally flat, rectangular input area 102. The input area 102 may overlay a dry erase surface, a projection area, or a display 900, such as an LCD, LED, or other display. When one or more input objects 110, such as a finger, pen, eraser, and/or other type of pointer, may be placed within the input area 102, the interactive input system 100 may identify that the input object 110 is hovering or is in contact with the input area 102, identify an input object type of the input object 110, record a position of the input object 110, disambiguate between one or more input objects 110, and/or transmit the position(s) and/or input object type(s) of one or more input objects 110 to a computing structure (not shown). The input area 102 may be scalable to different sizes and aspect ratios.

The computing structure may be a mobile phone, smartphone, tablet, laptop computer, desktop computer, and/or any other type of general or special purpose computer having at least one processor, tangible-computer readable medium, and transceiver (e.g. wired, wireless, cellular network, or otherwise) for communication over a network. The interactive input system 100 may communicate with the computing structure using a wired or wireless connection. For example, in one aspect, the interactive input system 100 may communicate using a universal serial bus (USB). In another aspect, the interactive input system 100 may communicate using a Bluetooth® transceiver.

The input area 102 may be surrounded on all sides by a light-emitting bezel 108. In this aspect, the light-emitting bezel 108 may be on all four sides of the input area 102. The light-emitting bezel 108 may provide a backlight to one or more imaging devices 104, such as digital cameras, line sensors, optical imagers, etc., for the input object(s) 110. In this aspect, four imaging devices 104a to 104d are provided in each corner of the input area 102. In other aspects, there may be two imaging devices 104 located in two of the corners of the input area 102 (e.g. upper corners, left corners, right corners, or bottom corners). The imaging devices 104 may have fields of view looking generally across the input area 102 towards at least a portion of the bezel 108. The imaging devices 104 may have each have a field of view generally encompassing at least a portion of the light-emitting bezel 108 and/or may also encompass at least a portion of the input area 102.

The imaging devices 104 may have a 480 pixel width or higher (e.g. up to 2048 pixels) resolution and may permit selection of a subset of pixels in order to permit higher frame rates of approximately 120 frames-per-second (fps). In this aspect, the imaging devices 104 may be a IMX397 image sensor provided by Sony Corp (JP). The imaging devices 104 may be sensitive to the backlight provided by the light-emitting bezel 108. For example, a filter (not shown) may be placed over the imaging device 104 in order to filter out all light except for the backlight of the light-emitting bezel 108.

As shown in FIGS. 1 and 2B, the bezel 108 may comprise segments (208*ad*, 208*bg*, 208*cf*, and 208*he*) of optical fibers 304, 310. Each respective segment 208 may be provided with illumination from one or more light emitting diodes (LEDs) 106. For example, segment 208*ad* may be provided with illumination from LEDs 106*a*, 106*d*. In another example, segment 208*bg* may be provided with illumination from LEDs 106*b*, 106*g*. A pair of LEDs 106 at each end of the segment 208 may provide generally constant illumination along the segment 208. In some aspects, the light emitting from the LEDs 106 may be directional.

In the aspect 200 shown in FIG. 2A, the bezel 108 may comprise a continuous optical fiber. The optical fiber 304, 310 may have two open ends where a pair of LEDs 206*a*, 206*b* emit light into the optical fiber 304, 310 from each end. The optical fiber 304, 310 may comprise at least three loops 210*a*, 210*b*, and 210*c* with a radius of curvature being approximately 25-mm for a glass-polymer and/or a glass-glass optical fiber. For polymer-polymer side emitting or polymer-polymer diffuse fibre, the radius of curvature may be approximately 8-mm. The loops 210*a*, 210*b*, 210*c* may be necessary as the optical fiber 304, 310 may not be bent with a tighter radius in order to prevent breakage.

Figure 2C:
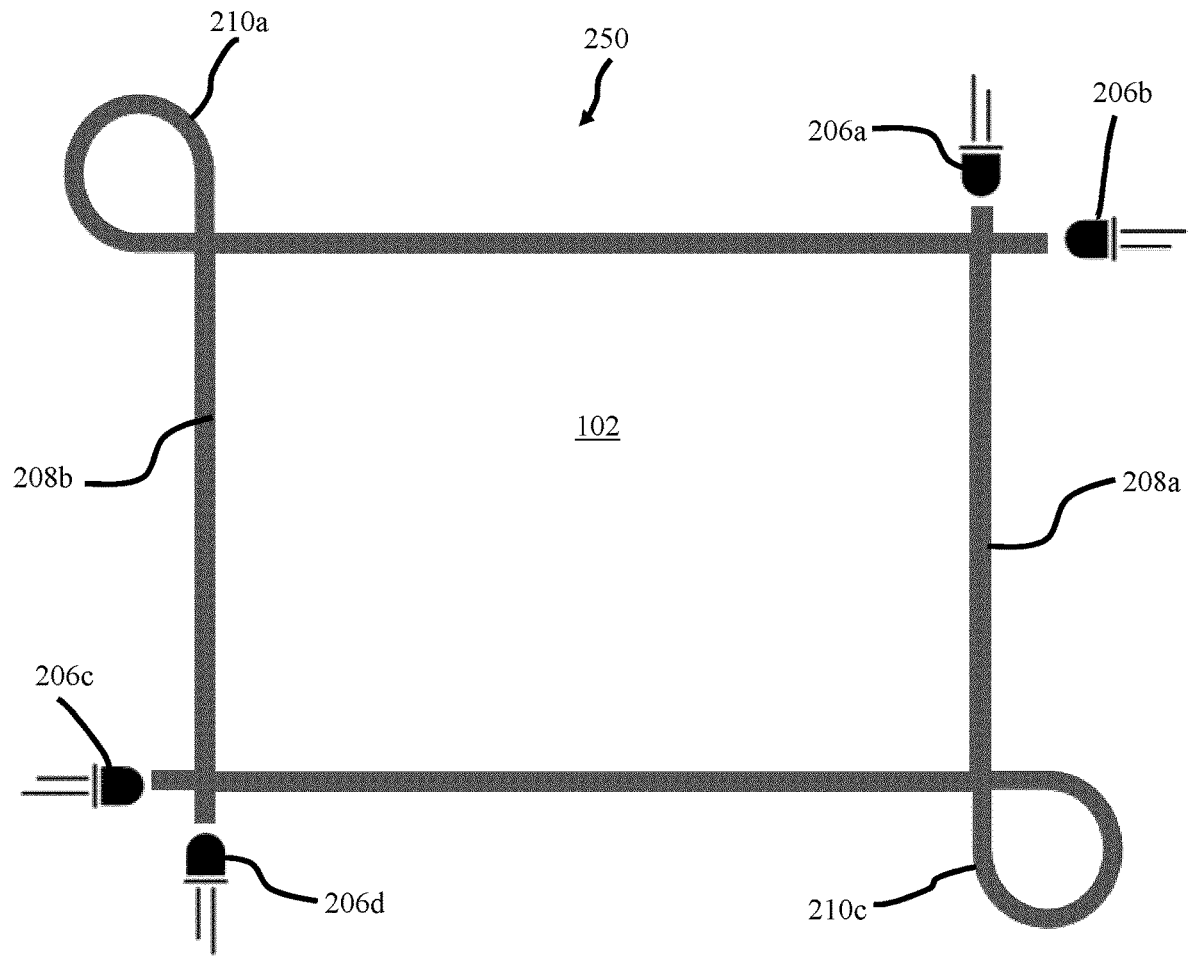
FIG. 2C is an exaggerated front view of the illuminated bezel using two segments of the optical fiber.

In the aspect 250 shown in FIG. 2C, the bezel 108 may comprise a pair of optical fibers 208*a*, 208*b*. The optical fibers 208*a*, 208*b* each comprise a loop 210*a* and 210*c* that may be necessary as the optical fiber 304, 310 may not be bent with a tighter radius in order to prevent breakage. In this aspect, a pair of LEDs 206*a*, 206*b* may emit illumination into their respective optical fibers 208*a*, 208*b*. In other aspects, particularly with long bezels 108, four LEDs 206*a*, 206*b*, 206*c*, and 206*d* may be used to illuminate the optical fibers 208*a*, 208*b*.

The LEDs 106 and/or 206 may emit near infrared (NIR) light in the range of 850-nm. In other aspects, the LEDs 106 and/or 206 may be replaced with infrared (IR) laser diodes. The optical fibers 304, 310 may have an outer cross-sectional diameter of approximately 230-μm permitting a lower height of the bezel 108. The optical fibers 304, 310 may be Fibrance™ technology produced by Corning or the optical fibers 304, 310 may be optical fibers as described with reference to FIGS. 6-8 below. The optical fibers 304, 310 may emit a continuous, uniform light along the input area 102. The emission of light may be conducted by using a back reflector to quasicollimate the light beam generally parallel to the input area 102. In some aspects, the emitted light may be diffuse horizontally along a plane above the input area 102 and generally constrained perpendicular to the plane. The optical fibers 304, 310 may then provide a uniform irradiation around the input area 102 perimeter. The optical fiber 304, 310 may have one or more optical nanostructures therein that emit or leak light. When light hits the nanostructures, the light may be evenly emitted or diffused out of the sides of the optical fiber 304, 310.

Figure 3A:
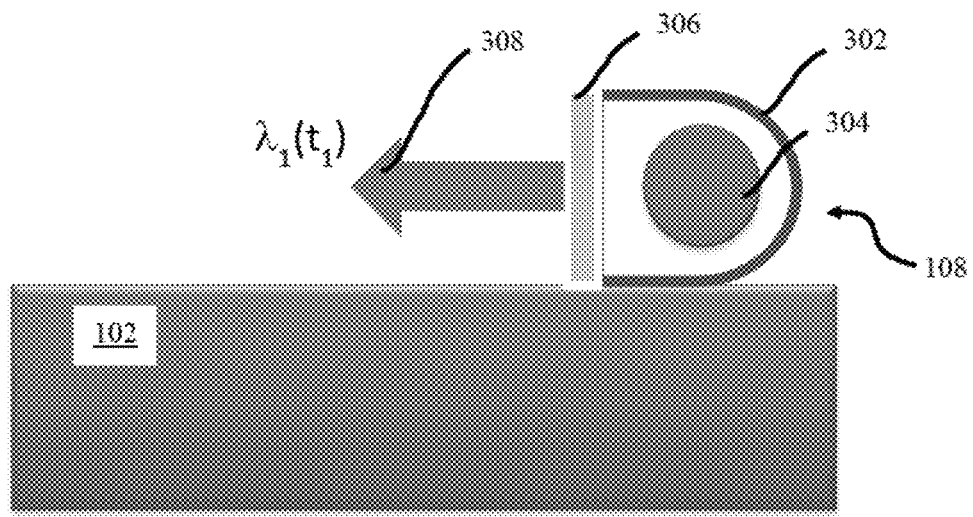
FIG. 3A is an enlarged side cross-section view of the illuminated bezel with the single optical fiber in the bezel.

Turning to FIG. 3A, the bezel 108 is shown in an enlarged cross-section. The bezel 108 may comprise a conduit 302 that may receive the optical fiber 304. The conduit 302 may be generally arcuate with an open side facing toward the input area 102. In some aspects, an interior of the conduit 302 may be reflective. In other aspects, the interior of the conduit 302 may be diffusely reflective. The open side of the conduit 302 may have a filter 306 extending across the open side. The filter 306 may improve a cosmetic appearance and/or protect the optical fiber 304. In some aspects, the filter 306 may add a narrow spectral band of LED light injected into the light guide. In some aspects, such as using a laser emitter, the filter 306 may not be required. The filter 306 may also protect the optical fiber 304 from damage. When an LED 106, 206 emits light into the optical fiber 304, the optical fiber 304 radiates light 308 through the filter 306 across the input area 102. In this aspect, a wavelength of the light may be modulated in the time domain according to the function $\lambda_1(t_1)$. According to one aspect, the light may be modulated according to any of the techniques provided in at least U.S. Pat. Nos. 9,189,086; 9,207,812; 9,292,109; 9,383,864; and/or 9,582,119; all of which are assigned to SMART Technologies ULC and all of which are herein explicitly incorporated by reference in their entirety.

Figure 3B:
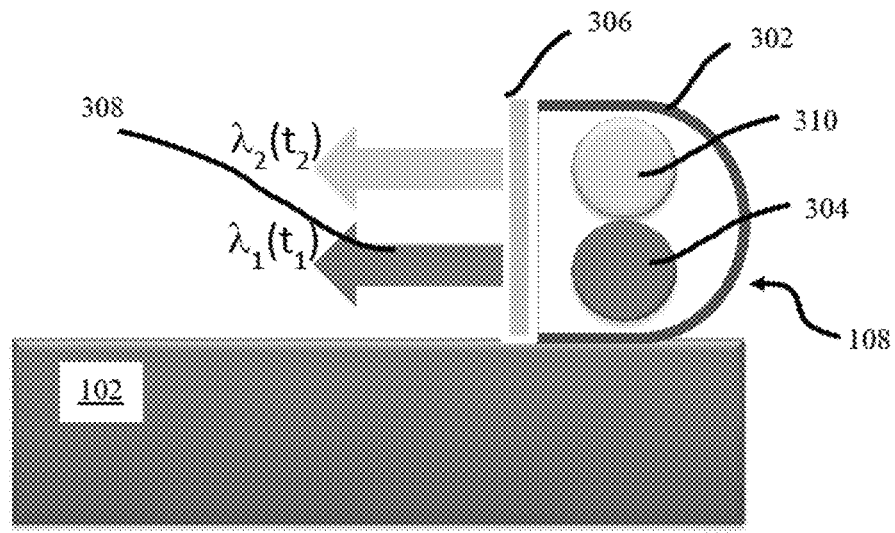
FIG. 3B is an enlarged side cross-section view of the illuminated bezel with multiple optical fibers in the bezel.

Similarly in another aspect, in FIG. 3B, the bezel 108 is shown in an enlarged cross-section. Instead of a single optical fiber 304, the conduit 302 and filter 306 may be enlarged to fit a plurality of optical fibers 304, 310. Each optical fiber 304, 310 may emit different wavelengths of lights $\lambda_1$, $\lambda_2$. For example, one optical fiber 304 may emit a wavelength of 780-nm and the other optical fiber 310 may emit a wavelength of 940-nm. The filter 306 may then be able to pass both the 780-nm and 940-nm wavelengths. In some aspects, the optical fiber 310 may modulate in the time domain according to the function $\lambda_2(t_2)$. In some aspects, a spacing element (not shown) may be placed between the optical fibers 304, 310 in order to keep them from becoming entangled.

Figure 4A:
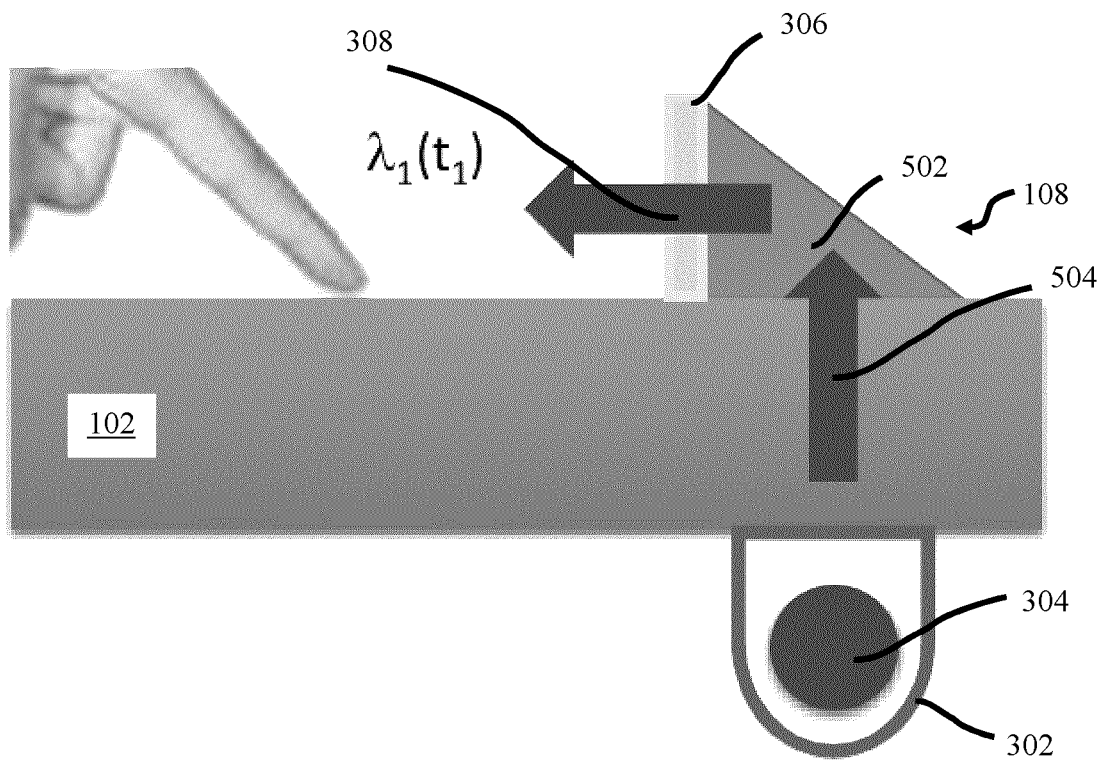
FIG. 4A is an enlarged side cross-section view of the illuminated bezel with a single optical fiber below a touch surface.
Figure 4B:
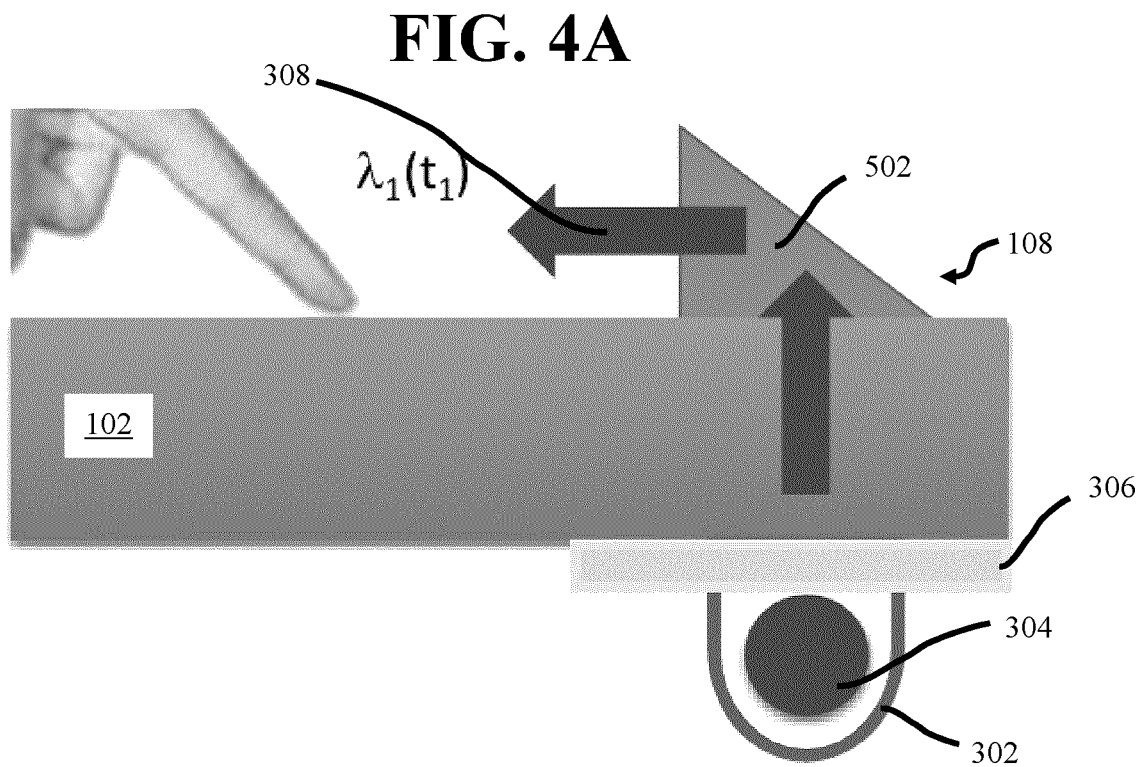
FIG. 4B is an enlarged side cross-section view of the illuminated bezel with a single optical fiber below the touch surface according to another aspect.

Turning to FIGS. 4A and 4B, the optical fiber 304 may be housed beneath a transparent (or translucent) input area 102 within the conduit 302. The optical fiber 304 may emit light 504 from the optical fiber 304 generally perpendicular to the input area 102. The bezel 108 may comprise a light redirection element 502, such as a reflector, a prismatic element, or a prism, that may comprise one or more facets. The light redirection element 502 may redirect the light 504 emitted generally perpendicular to the input area 102 into a light direction 308 generally across the input area 102. In the aspect depicted in FIG. 4A, the filter 306 may be present along a facet of the light redirection element 502. In the aspect of FIG. 4B, the filter 306 may be located beneath the input area 102.

Figure 5:
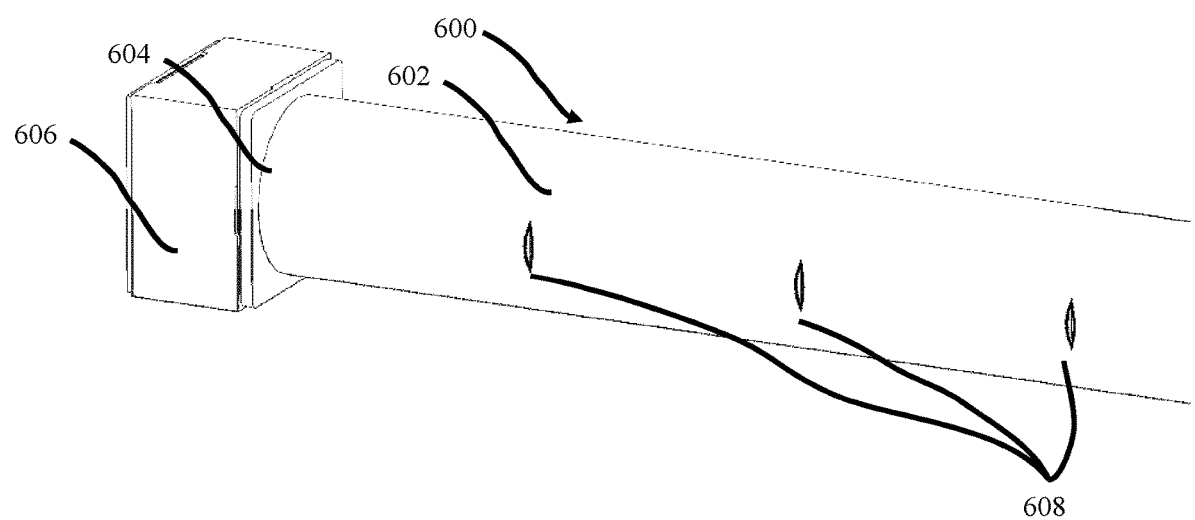
FIG. 5 is a perspective view of a section of the illuminated bezel having one or more grooves penetrating both a cladding and a light-carrying core of the optical fiber.

FIG. 5 shows a light guiding conduit 600 having a core 604 (e.g. the optical fiber 304) covered with a cladding 602 having a lower index of refraction than the core 604. The core 604 may be plastic optical fiber. An LED 606 may emit light into the core 604 at one or both ends whereby the cladding 602 may cause the light to propagate within the core 604 using total internal reflection (TIR). The cladding 602 may reduce light transmission losses by providing protection from one or more environmental conditions of TIR inside light conduit, which may offer longer illuminated bezels 108 for large input areas 102.

In this aspect, the LED 606 may emit infrared light. A plurality of nanostructures, such as notches 608 (or grooves), may be cut into the cladding 602 to a depth necessary to also cut into the core 604. In this aspect, the notches may be generally V-shaped from an outer surface of the cladding 602 to the core 604. In some aspects, the notches 608 may have a leaf-shaped profile. The notches 608 may act as secondary light sources (e.g. similar to or the same as discrete point sources) causing the light propagating within the core 604 to be spatially redirected due to reflection at a plastic-air interface.

As light emitted by the LED 606 propagates along an optical axis of the cylindrical core 604 of the light guiding conduit 600, the propagated light undergoes total internal reflection (TIR) at an interface between the core 604 and the cladding 602. Since the leaf-shape of the notches 608 penetrates into the cladding 602 and barely into the core 604, the notches 608 may cause another TIR that redirects the propagated light in a direction generally orthogonal to the optical axis of the core 604. This notch TIR at the notches 608 may result in little light leakage. Thus the notch TIR may be very localized and have low losses forming the discrete light source. In other aspects, the leaf-shaped notches 608 may form a cylindrical lens for the discrete light sources using the clear core 604 and the clear cladding 602. For example, the light from the discrete light source may be collimated by the cylindrical profile of the leaf-shaped notches 608 to be generally perpendicular-to-touch-surface plane freely spreads out in a plane generally parallel to the input area 102. Thus, a diverging light fan may be formed from every notch via a clear cylindrical waveguide. The plurality of notches 608 may form a light curtain closely above the input area 102.

The light may be diffusely emitted or otherwise. In this aspect, the notches 608 spaced evenly along the light guiding conduit 600. The notches 608 may have a equidistant cadence that may minimize optical losses along an optical path within light guide core 604. The cadence and notch 608 sizes (e.g. width, length, and/or depth) may be optimized to control a light decay along the full length of the light guide core 604. The depth of the notches 608 may influence an output intensity at each notch 608. In some aspects, the depth of the notches 608 may change along the core 604.

In other aspects, the notches 608 may be spaced closer together in some portions and spaced further apart in other portions. For example, the spacing of the notches 608 may be used to compensate for the light decay along the core 604 by having a denser notch placement away from the LED(s) 606 at the end(s) of the core 604. In this aspect, equal spacing may be used to provide a more practical method of mass production. In other aspects, for a 16:9 screen ratio, adjusting the spacing between the notches 608 may be defined by a polynomial that may be influenced by both a geometry ratio of the input area 102 and a relative illumination curve of lenses of the imaging device 104. When placed around the perimeter of the input area 102, the notches 608 may form an array of elementary light sources emitting the light into the input area 102.

Figure 6:
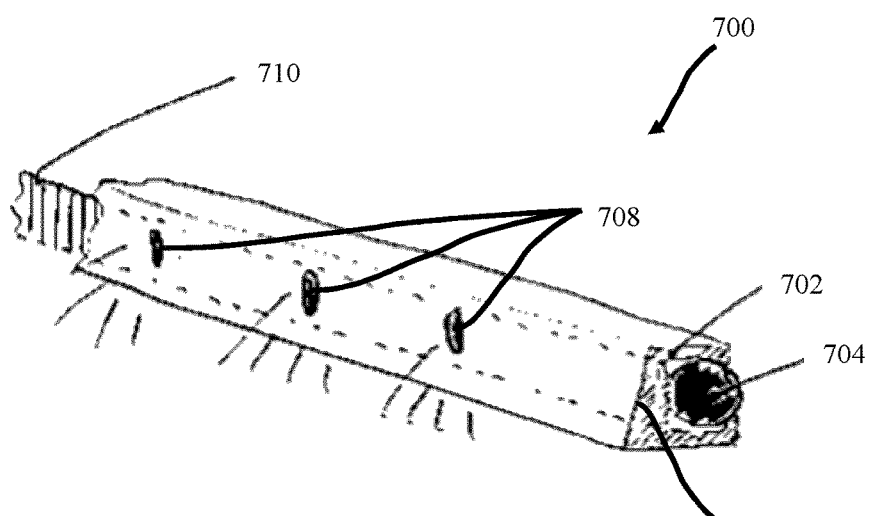
FIG. 6 is a sketch of another section of the illuminated bezel having an auxiliary uniformity tape inserted into a protective sleeve.

According to another aspect shown in FIG. 6, a light guiding conduit 700 may have a core 704 for receiving light emitted from an LED (not shown). The core 704 may have cladding 602 as previously described. In this aspect, the core 704 may have a plurality of notches 708 into the core 704 and cladding 602 to enable the light within the core 704 to be emitted through the notches 708. A tape 710 may be affixed along the core 704 using adhesives and the tape 710 may cause light passing through the tape 710 to be diffused and/or dispersed (e.g. spread an angle of the light emitted by each notch 708). A sleeve 702 transparent to the light emitted into the core 704 may be placed over the core 704 and the tape 710. In another aspect, the tape 710 may be affixed to the sleeve 702 rather than the core 704. The sleeve 702 may generally encompass approximately 75% of the core 704. A sloped surface 712, which the light from the notches 708 may pass through, generally slopes towards the input area 102 so that a base of the sleeve 702 may be longer than a top of the sleeve 702. The notches 708 may be on an opposite side of the core 704 from the sleeve 702. The light from the notches 708 may be focused by the clear core 704 and/or cladding 602.

For example, the uniformity tape 710 may have on one side an adhesive polymer film and another side may have a prismatic structure. The film may spread incoming light into a wider angle in one plane to form a light curtain above the input area 102. In some other aspects, the tape 710 may be a diffusion film that is may be dry inserted into the sleeve 702. In one aspect, the tape 710 may spread light emitted from the notches 708 to wider than a +/−60-degree angle and/or may smear discrete notch 708 sources as viewed by the imaging devices 104. The tape 710 may spread light in a plane parallel to input area 102.

Figure 7A:
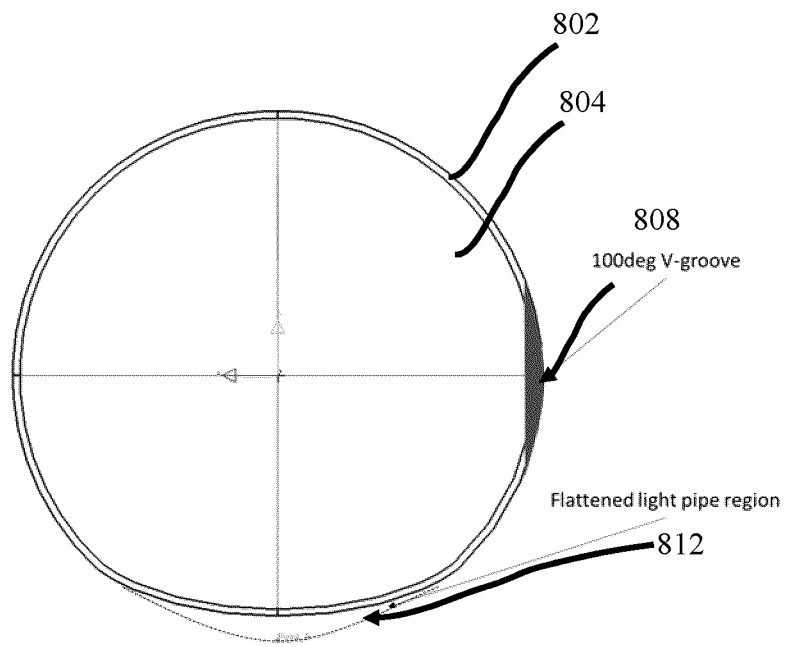
FIG. 7A is a side cross-sectional view of an optical fiber modified from a circular shape into a shape with orientation-preserving features.
Figure 7B:
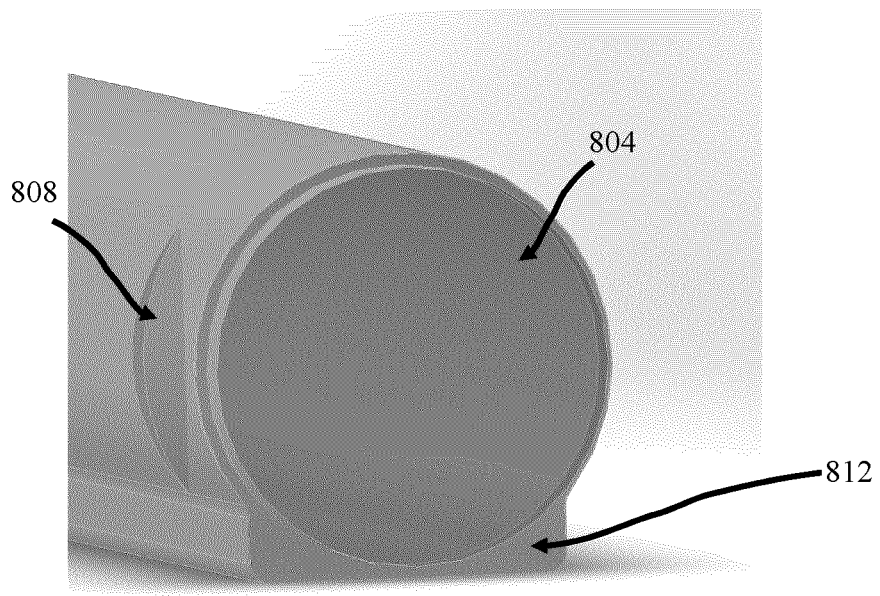
FIG. 7B is a perspective cross-sectional view of an optical fiber modified from a circular shape into a shape with orientation-preserving features.

Turning to FIGS. 7A and 7B, a cross-section of the core 804 encompassed by the casing 802 is shown. The nanostructure (e.g. notch 808) may comprise a 100-degree V-shaped groove that passes through the casing 802 and into the core 804. In some aspects, the casing 802 may comprise a flattened region 812 along one side of the casing 802. The flattened region 812 may facilitate installation around the perimeter of the input area 102 such that the notches 808 may be oriented toward the input area 102 and ensure a maximal optimal signal may be directed to the imaging devices 104. The flattened region 812 may attenuates optical light along core 804 but may be useful for proper orientation of the core 804 and casing 802.

In any of FIGS. 5 to 7B, an emitting optical flux from the notches 608, 708, 808 (or light-redirecting grooves) located along the light guide 600, 700, 800 around the perimeter of the input area 102 may be customized to provide an optimal light distribution towards the optical imaging devices 104 to favor contact detection of the pointer 110 with the input area 102 and/or accuracy of the pointer 110 location. The notches 608, 708, 808 may comprise a profile depth and a profile angle that penetrates both into the cladding 602, 802 and into the core 604, 704, 804, which may provide sufficiently intense optical flux from an end-coupled infrared light sources 106, 606 having an angular emission generally matching a numerical aperture of the light guide 600, 700, 800.

FIGS. 8A to 8E demonstrate a portion of the interactive input system 100 incorporating the aspects described in FIGS. 5, 6, and 7A-7B as previously described. The interactive input system 100 comprises the input area 102 encompassed by the light guiding conduit 600, 700, 800. The light guiding conduit 600, 700, 800 may comprise the loop 210 at one or more corners of the input area 102. As shown particularly in FIG. 8B, 8C, and 8D, a portion of the loop 210 may extend beneath a plane of the input area 102. The light guiding conduit may comprise one or more notches 608, 708, 808 emitting light across the input area 102 toward one or more imaging devices 104. Shown particularly in FIG. 8D, the light guiding conduit 108 may have a raised portion 910 in the one or more corners generally higher from the input area 102 than the imaging device 104. The raised portion 910 may compensate for darker corners caused by the imaging device 104.

Figure 8A:
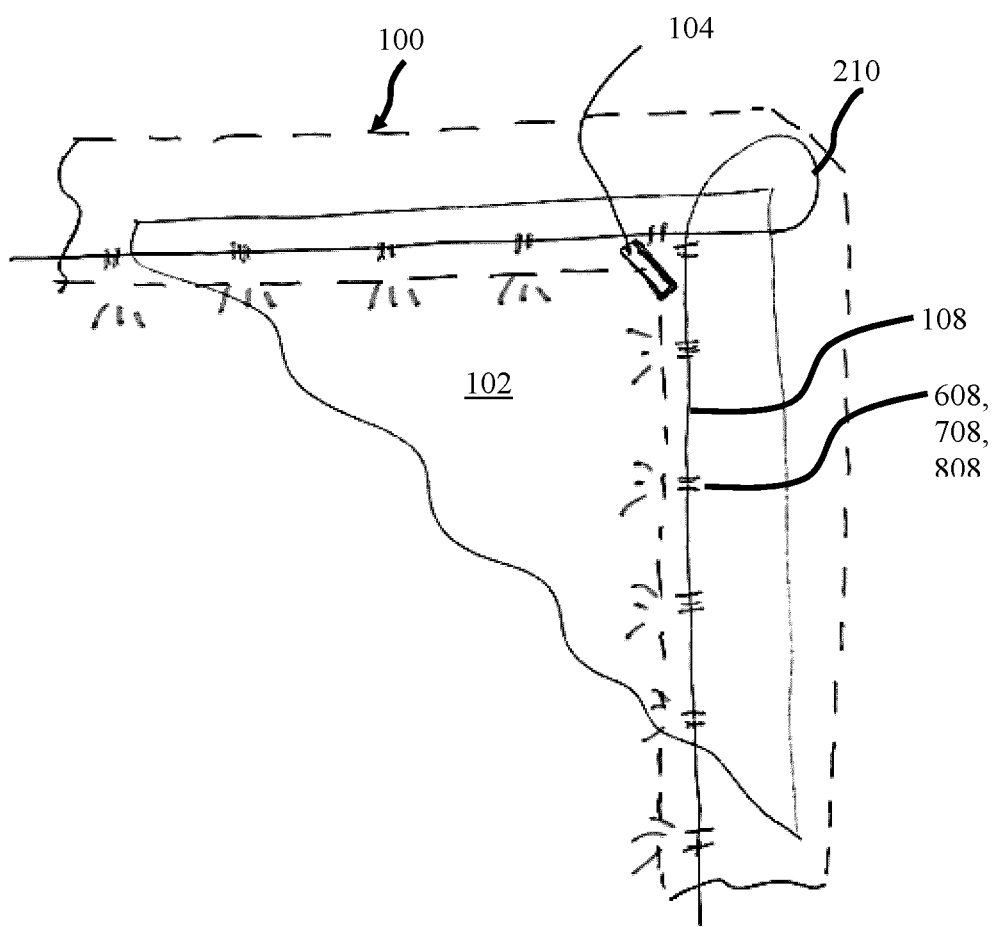
FIGS. 8A to 8E are sketches of the optical fiber in use with portions of the interactive input system.
Figure 8B:
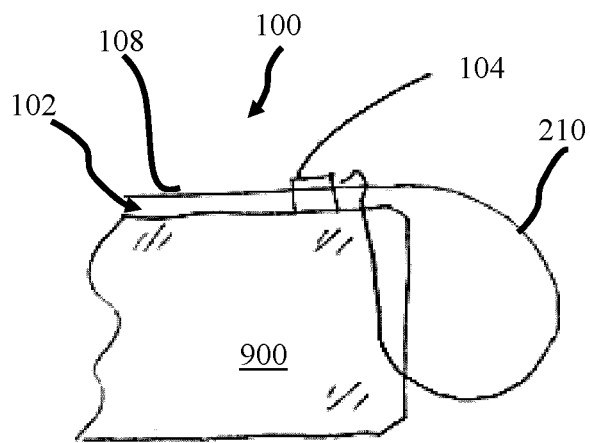
Figure 8C:
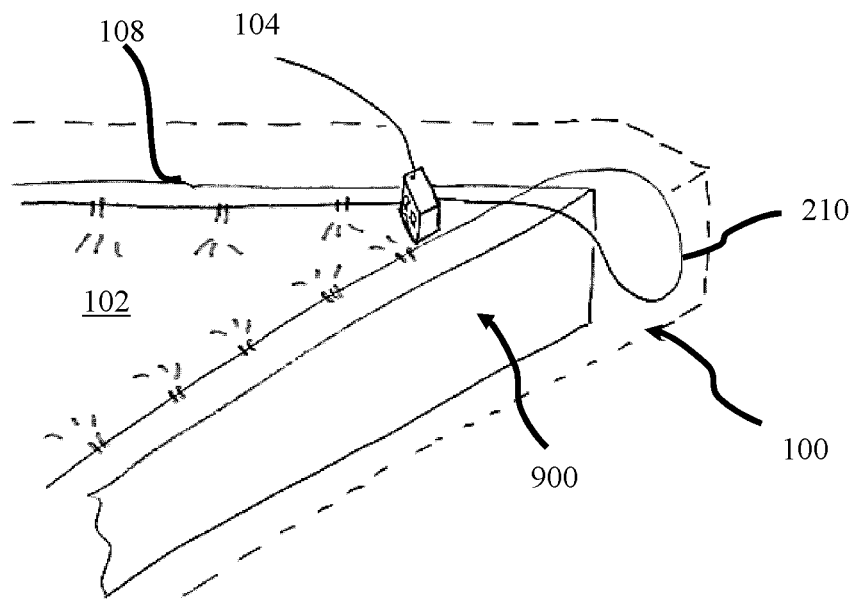
Figure 8D:
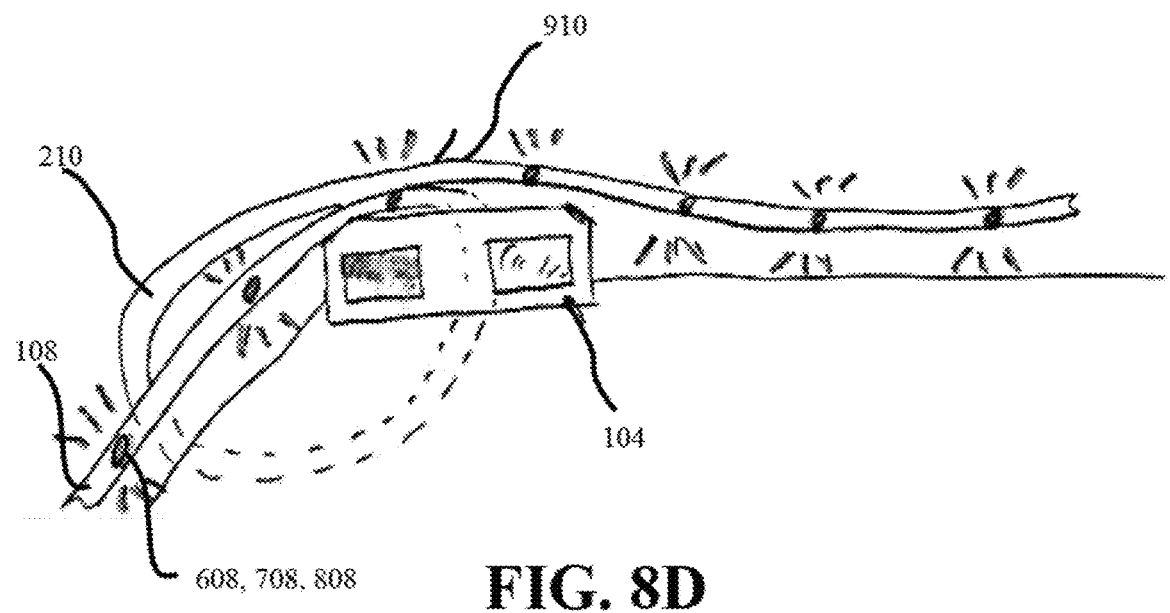
Figure 8E:
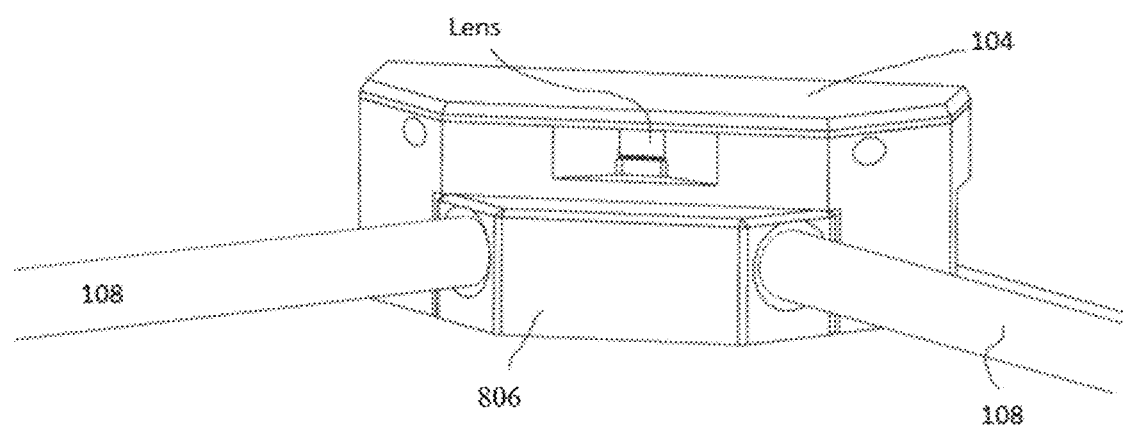

The one or more imaging devices 104, placed in corner locations, may have fields of view in excess of 90-degrees and may observe at least three opposing imaging devices 104 present in the corners of the input area 102. The imaging devices 104 may coincide with location of corresponding light coupler modules where light may be injected from the LEDs 106, 606 into the segments (208ad, 208bg, 208cf, and 208he) as shown particularly in FIG. 2B and FIG. 5. In this aspect, a zone of low intensity or zero intensity may be observed by the opposing imaging devices 104. The zone of low intensity may introduce ambiguity in determining and tracking the input object 110. In order to mitigate the zone of low intensity observed by the opposing imaging devices 104, a diffusely glowing coupler 806 may located proximate to the zone of low intensity in order to provide additional illumination. For example as shown in FIG. 8E, the diffusely glowing coupler 806 may be placed between the lens of the imaging device 104 and the input area 102. In some examples, the coupler 806 may be generally aligned with the lens of the imaging device 104. In some examples, the coupler 806 may be generally aligned along the optical fiber 108. Some aspects may have the coupler 806 separate from the imaging device 104 while other aspects may have a single body for the coupler 806 and the imaging device 104.

The diffuse glowing properties of the diffusely glowing coupler 806 may be achieved by selecting materials with specific optically scattering and/or partially absorptive properties. The diffuse glowing may be provided by controlled leakage of light from LED 106, 606 from light coupler modules into the adjacent diffusely glowing coupler 806. In another aspect, one or more separate miniature LEDs (not shown) may be embedded inside the diffusely glowing coupler 806 to ensure diffuse glowing near the zone of low intensity. In some aspects, the diffusely glowing coupler 806 may be calibrated to have a light intensity similar in intensity to the light intensity of the light-emitting bezel 108 and/or the optical fiber 108.

Figure 9:
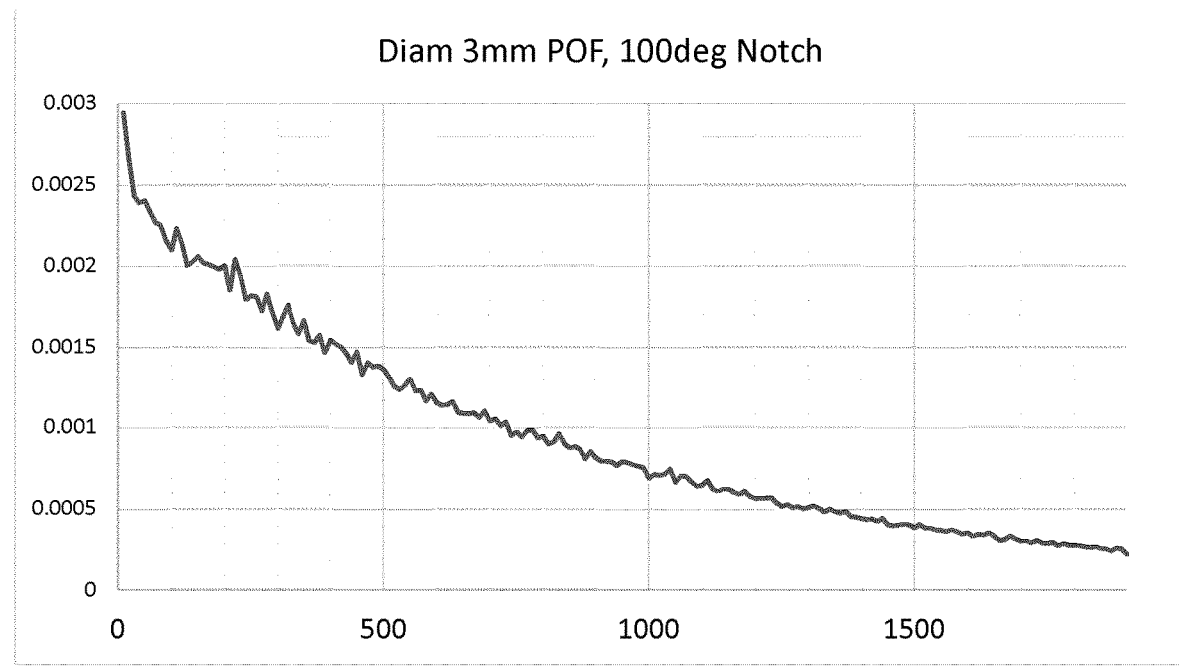
FIG. 9 is a simulation plot defining light output for a single notch used in individual V-groove or notch optimization.
Figure 10:
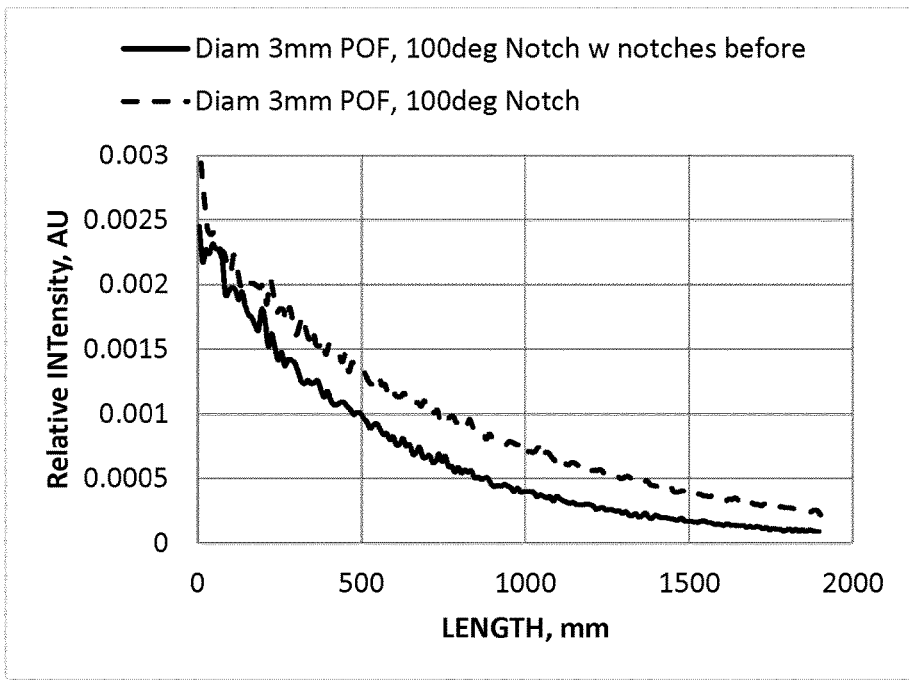
FIG. 10 is a simulation plot defining light output for the single notch in the presence of a 5-mm equidistance notch neighbours.
Figure 11:
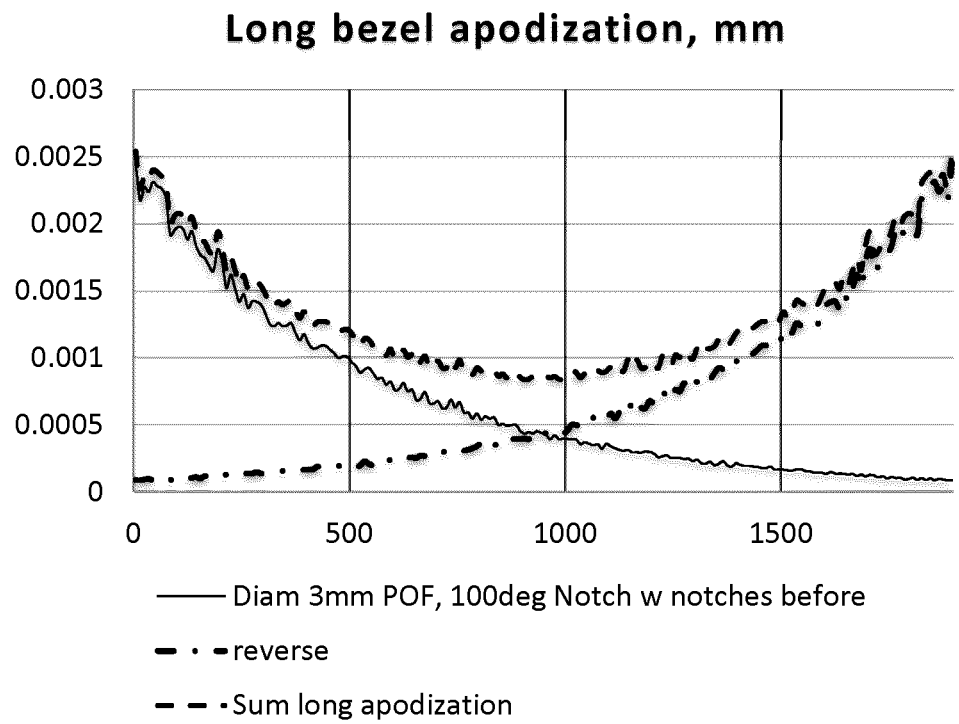
FIG. 11 is a simulation plot defining light output for the single notch for a 1900-mm long optical fiber.
Figure 12:
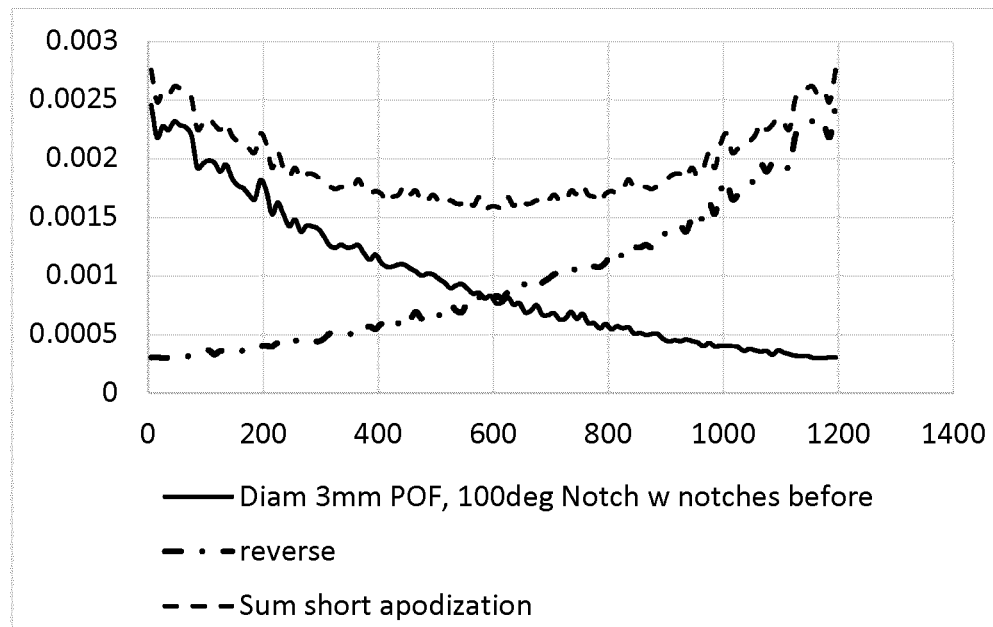
FIG. 12 is a simulation plot defining light output for the single notch for a 1200-mm long optical fiber.

Turning to FIG. 9, a simulation plot demonstrates the light output for a single notch 608, 708, 808 in an approximately 1900-mm plastic optical fiber (e.g. 3-mm diameter) with no neighboring notches 608, 708, 808 as if notch had no neighboring notches. The light emitter in this plot is only from one end. The plot may be used to optimize an individual V-groove and/or notch parameters in isolation. FIG. 10 demonstrates a plot of the light output for the single notch 608, 708, 808 in the presence of a plurality of 5-mm equidistance notch neighbors 608, 708, 808. FIGS. 11 and 12 show plots demonstrate the light output of the single notch 608, 708, 808 in the presence of a plurality of 5-mm equidistance notch neighbors 608, 708, 808 for lengths of the plastic optical fiber of approximately 1900-mm and approximately 1200-mm respectively. In order to demonstrate a light emitter at both ends, the simulation for the light emitter on one end was reversed and the sum of the two plots provides a light output for a system having light emitters at both ends. In these plots of FIGS. 9 to 12, the notch may have a 100-degree opening (e.g. +/−50-degrees off a perpendicular to the optical fiber).

Although the aspects herein describe using infrared light wavelengths for the optical fibers 304, 310, other aspects may have additional optical fibers for receiving visible light such as red, green, and/or blue. These visible light optical fibers may emit light into the input area 102 to indicate a touch detection, panel status, etc.

According to another aspect, the optical fibers 304, 310 may be used to monitor ambient light levels from different directions. In this aspect, the optical fibers 304, 310 may act as optical receivers. The long bezels around the perimeter of the input area 102 may be analyzed along each edge of the input area 102. For each side, one or more ambient signals may be analyzed based on spectral content, optical flux level, and/or temporal frequencies. In some aspects, this analysis and measurements may be used to mitigate parasitic frequencies influencing the interactive input system 100.

Although the aspects described herein demonstrate a single type of light emitter, other aspects may include a plurality of emitters, such as three emitters or LEDs, on both ends of the light conduit. Each of the plurality of emitters may emit a different spectrum of light. In this aspect, the plurality of emitters may comprise three spectrally monochromatic light emissions and two additional spectrally mixed infrared light emissions.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An interactive input system comprising:
   an input area with a bezel;
   at least two imaging devices having fields of view encompassing at least a portion of the bezel;
   an optical fiber housed within the bezel provides backlight illumination to at least one input object;
   at least one light source providing a light to an end of the optical fiber; and
   a processing structure executing instructions from a tangible computer-readable medium, the instructions comprising at least one of:
   receiving at least one image from each of the at least two imaging devices;
   detecting the at least one input object;
   determining a position of the at least one input object; and
   tracking the position of the at least one input object;
   wherein the optical fiber comprises at least one nanostructure at an outer surface of the optical fiber for emitting light out of the optical fiber; the at least one nanostructure diffuses the light and constrains the light across the input area toward the at least two imaging devices; and the at least one nanostructure comprises a plurality of notches penetrating from the outer surface of the optical fiber into a cladding and to a core of the optical fiber; and
   wherein each of the plurality of notches comprises a leaf-shaped profile to collimate the light perpendicularly to a surface plane of the input area.

2. The interactive input system according to claim 1, wherein the leaf-shaped profile forms a cylindrical lens.

3. The interactive input system according to claim 1, wherein the plurality of notches each comprise about a 100-degree opening.

4. The interactive input system according to claim 1, wherein the light propagates within the core of the optical fiber.

5. The interactive input system according to claim 1, further comprising at least one camera filter on each of the at least two imaging devices.

6. The interactive input system according to claim 1, wherein the optical fiber comprises at least one segment.

7. The interactive input system according to claim 1, wherein the optical fiber has an outer cross-sectional diameter of about 230-µm.

8. The interactive input system according to claim 1, wherein the bezel further comprises a light redirection element.

9. The interactive input system according to claim 1, wherein the at least one light source modulates the light in a time domain.

10. The interactive input system according to claim 1, wherein the bezel comprises a conduit for receiving the optical fiber.

11. The interactive input system according to claim 10, further comprising a filter extending along the conduit and filtering the backlight illumination.

12. The interactive input system according to claim 1, further comprising at least one additional optical fiber.

13. The interactive input system according to claim 12, wherein the bezel comprises a conduit for receiving the optical fiber and the at least one additional optical fiber.

14. The interactive input system according to claim 1, wherein the at least one light source provides a first wavelength of the light.

15. The interactive input system according to claim 14, further comprising a second optical fiber housed within the bezel providing a second wavelength of the light.

16. The interactive input system according to claim 1, wherein the optical fiber comprises a continuous optical fiber.

17. The interactive input system according to claim 16, wherein the optical fiber comprises at least one loop.

18. The interactive input system according to claim 17, wherein the at least one loop has a radius of curvature of between about 8-mm to about 25-mm.

* * * * *